Sept. 2, 1941.   J. G. VINCENT   2,254,334
MOTOR VEHICLE
Filed March 7, 1939   5 Sheets-Sheet 1

INVENTOR.
Jesse G. Vincent
BY
Tibbetts & Hart
ATTORNEYS

Sept. 2, 1941.　　　J. G. VINCENT　　　2,254,334
MOTOR VEHICLE
Filed March 7, 1939　　　5 Sheets-Sheet 2
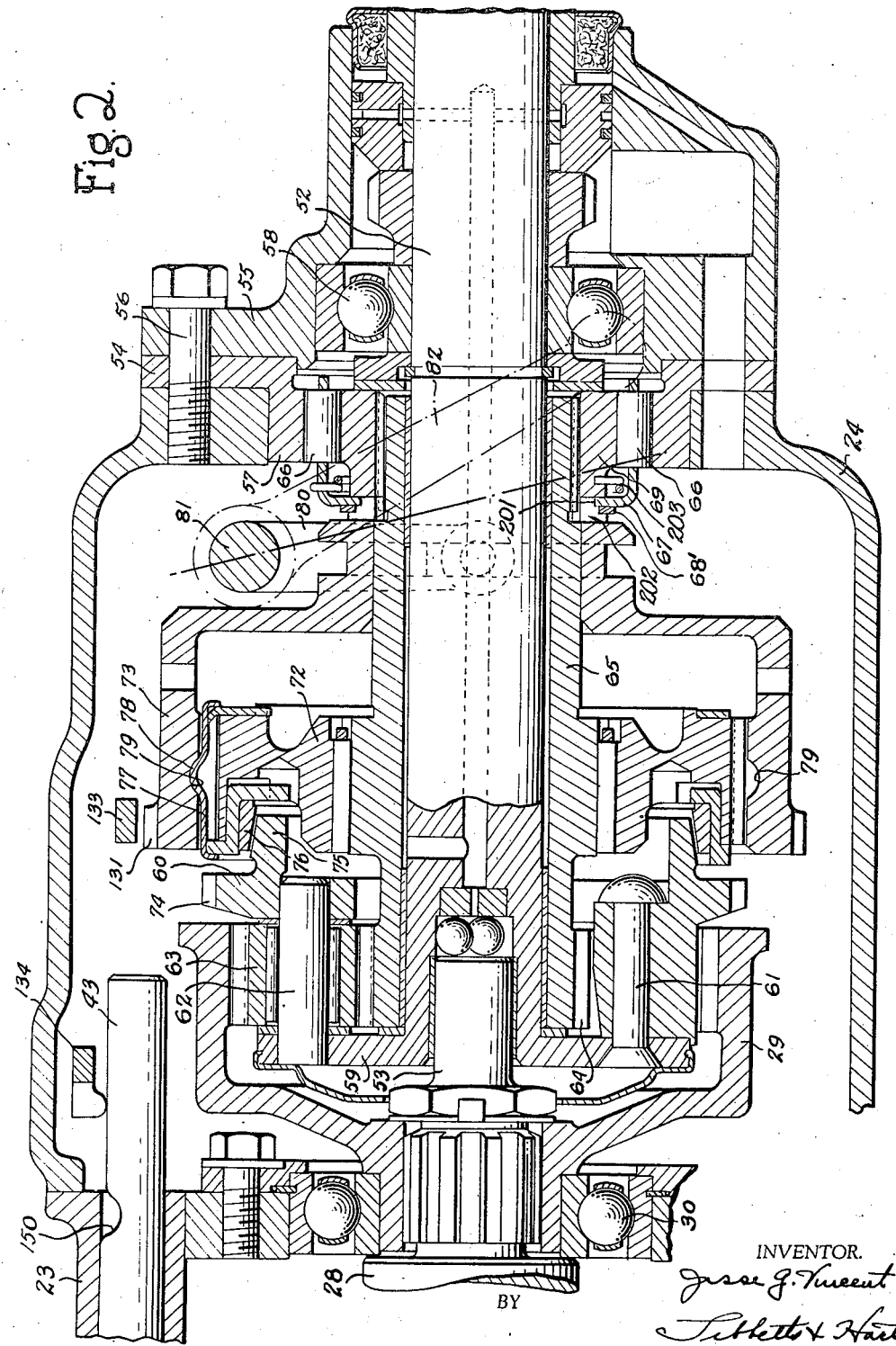
INVENTOR.
Jesse G. Vincent
BY
Tibbetts & Hart
ATTORNEYS

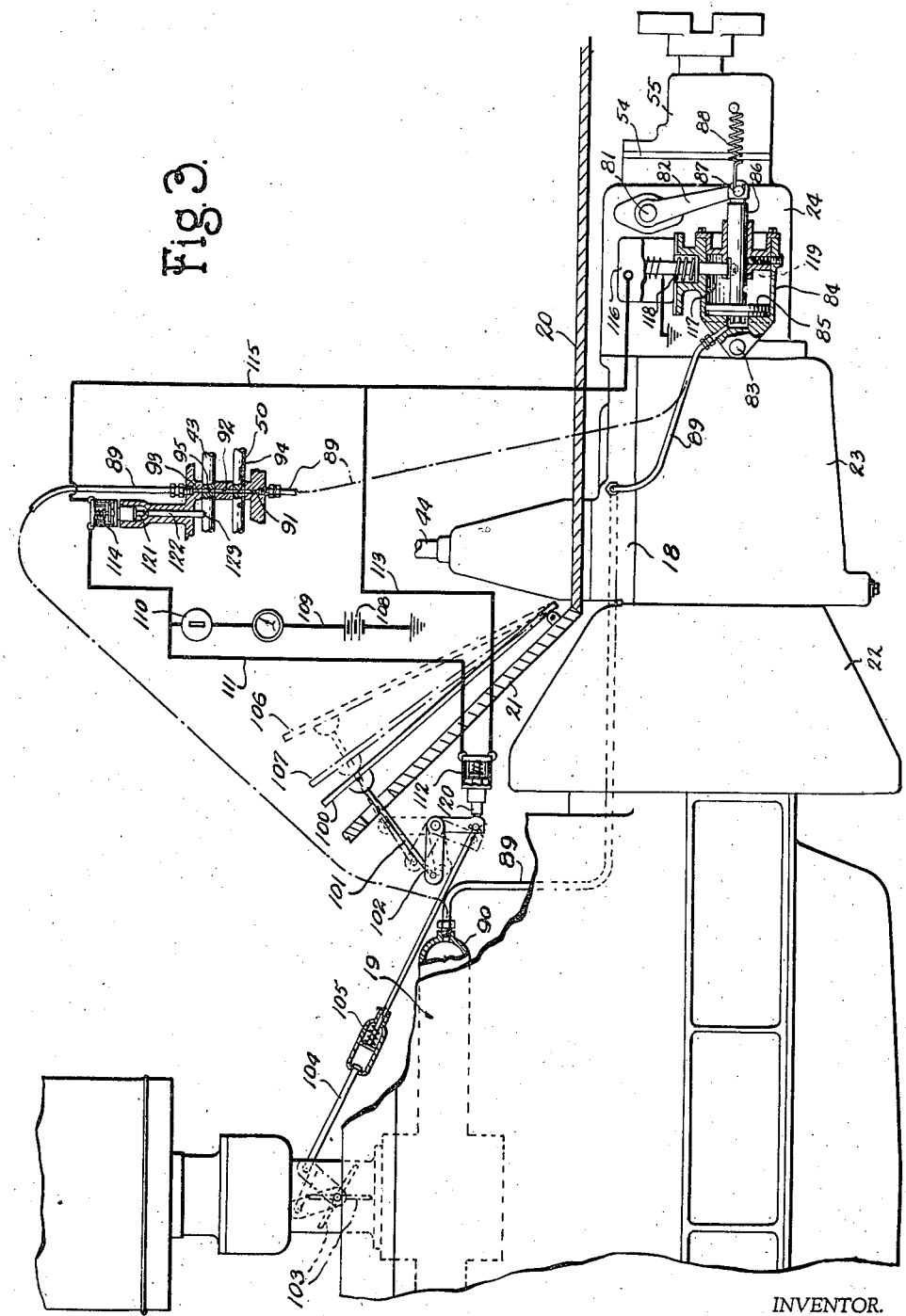

Sept. 2, 1941.    J. G. VINCENT    2,254,334
MOTOR VEHICLE
Filed March 7, 1939    5 Sheets-Sheet 4

INVENTOR.
Jesse G. Vincent
BY
Tibbetts & Hart
ATTORNEYS

Sept. 2, 1941.    J. G. VINCENT.    2,254,334
MOTOR VEHICLE
Filed March 7, 1939    5 Sheets-Sheet 5

INVENTOR.
Jesse G. Vincent
BY Tibbetts & Hart
ATTORNEYS

Patented Sept. 2, 1941

2,254,334

UNITED STATES PATENT OFFICE 2,254,334

MOTOR VEHICLE

Jesse G. Vincent, Grosse Pointe, Mich., assignor to Packard Motor Car Company, Detroit, Mich., a corporation of Michigan Application March 7, 1939, Serial No. 260,404

15 Claims. (Cl. 74—328)

This invention relates to power transmitting mechanism of the type more particularly adapted for use with motor vehicles.

An object of the invention is to provide a power transmitting mechanism in which the drive from standard change speed gearing can be readily modified by the driver to produce an additional driving speed without changing the relation of the gearing.

Another object of the invention is to provide power transmitting mechanism for motor vehicles in which the drive from standard change speed gearing can be readily modified by slight effort on the part of the driver when the gearing is in a reduction drive relation.

Another object of the invention is to provide power means under control of a motor vehicle accelerator pedal for modifying the driving speed of change speed gearing.

A further object of the invention is to provide a power transmitting mechanism, in which a planetary gearing and an overrunning brake are associated in the drive from standard change speed gearing, with a connection operated by a shift rail for positively locking the overrunning brake during reverse drive.

Another object of the invention resides in control apparatus for mechanism having planetary gearing and an overrunning brake through which drive from a change speed mechanism is transmitted.

A further object of the invention is to provide a power shifting mechanism for motor vehicle change speed mechanism that is electrically selective under the control of the driver.

Other objects of the invention will appear from the following description taken in connection with the drawings, which form a part of this specification:

Fig. 2 is a fragmentary enlarged view of the same;

Fig. 3 is a diagrammatic view, partly in plan and partly in side elevation, showing the control apparatus for the power shifting mechanism;

Figure 1:
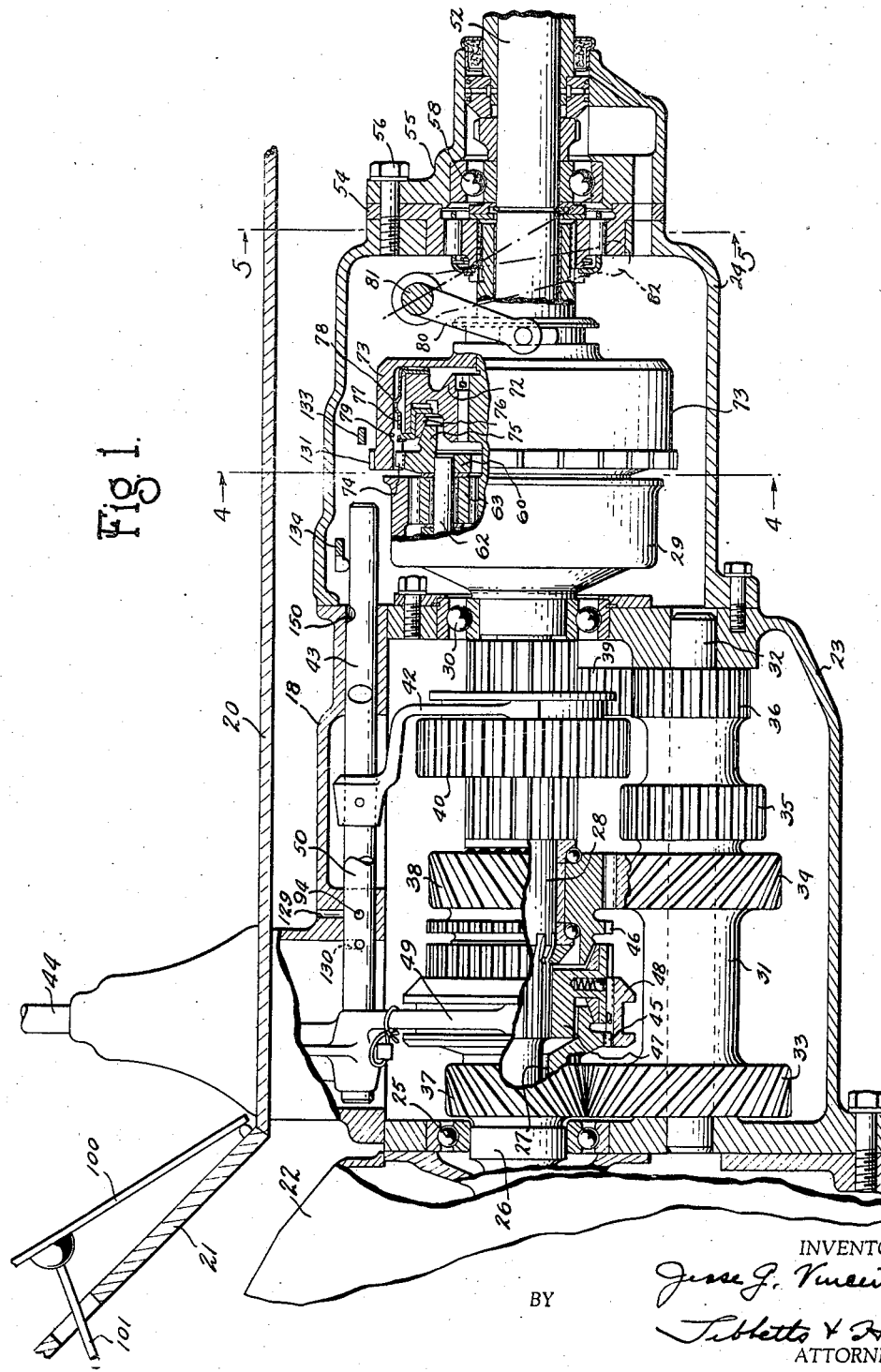
Fig. 1 is a vertical sectional view of a motor vehicle power transmitting mechanism and control apparatus incorporating the invention.

The power transmitting mechanism herein described is designed for use where a plurality of driving speed ratios is desired, and it is particularly adapted for use in motor vehicles. The mechanism is shown arranged beneath the floorboard 20 and the toe board 21 in a conventional manner. The power transmitting casing structure comprises generally bolted-together sections 22, 23 and 24. Section 22 houses a conventional clutch and flywheel, section 23 houses conventional change speed gearing for obtaining a plurality of forward driving speed ratios and a reverse drive, and section 24 houses mechanism for modifying the drive transmitted from the change speed gearing.

The front wall of casing 23 carries a suitable bearing 25 in which is mounted the enlarged rear end of drive shaft 26, which may be the vehicle clutch shaft, driven from the vehicle engine 19 through conventional clutch mechanism (not shown). The enlarged end of the driving shaft is formed with an axial recess for the reception of bearing 27, in which the forward end of the intermediate or tail shaft 28 is journaled. The rear end of the tail shaft extends through the rear wall of casing section 23 and has splined thereon a tail gear 29 journaled in bearing 30. A gear spool 31 or countershaft is rotatably mounted on shaft 32 in the casing section 23 and has fixed thereon gears 33, 34, 35 and 36. Gear 33 is in constant mesh with a gear 37 formed on the enlarged end of drive shaft 26, so that the countershaft is continuously connected in positive driven relation therewith. Gear 34 is also continuously in mesh with a gear 38 which is rotatably mounted on the intermediate shaft 28.

Gears 35 and 36 constitute the low speed and reverse gears respectively, gear 36 being continuously in mesh with a conventional reverse idler gear 39. A gear 40 is slidably splined on tail shaft 28 and has external teeth engageable with the reverse idler gear and with gear 35. Shifter fork 42 engages the gear 40 and is carried on shift rail 43 suitably mounted in bearings in the cover portion 18 of the central casing section 23. The shift rail is selectively actuated by a lever 44 of usual form which may be manually operated by the vehicle driver in the well known manner.

Thus in the illustrated embodiment of the invention, gear 40 may be moved to mesh with gear 35 to provide a first speed forward, or moved to mesh with idler gear 39 to provide a reverse drive. Second and third forward speeds can be obtained when gear 38 is connected in driving relation with the tail shaft 28, and high or fourth forward speed is secured by coupling shafts 26 and 28 to provide direct drive. Gear 37 has clutch teeth 45 formed thereon and similar clutch teeth 46 are formed on gear 38. Between these clutch teeth is a movable synchronizing positive clutch having a hub section 47 slidably splined to shaft 28 and a rim section 48, such sections having slidably engaging teeth and the teeth of the rim section being engageable with clutch teeth 45 or 46. When the teeth of the clutch rim section engage teeth 45 direct drive is established between shafts 26 and 28, and when the rim section teeth engage teeth 46 then gear 38 is coupled to the tail shaft and second or third forward speeds can be obtained. The rim section of the clutch has a shifter fork 49 associated therewith which is mounted on shift rail 50 mounted in bearings in the cover 18 and arranged to be actuated by shift lever 44 in the usual manner.

In the casing section 24 is mechanism for establishing either second or third forward driving speed and allowing free wheeling when first and second speed drives are established. In casing 24 is a driven shaft 52 for transmitting power to the vehicle traction wheels arranged in aligned axial relation with the tail shaft 28 and having the forward end thereof provided with a recess that receives the pilot 53 on the rear end of the tail shaft. The rear wall of casing section 24 has a ring 54 and a cover 55 secured thereto by bolts 56. Extending forwardly from the ring 54 is a bearing or race 57 that encircles the driving shaft, and carried in the cover 55 is a bearing 58 for supporting the driven shaft.

The tail shaft and the driven shaft are positively connected by planetary gearing, including tail gear 29, that when locked transmits direct drive from the tail shaft to the driven shaft, and when released provides a reduced drive or underdrive from the tail shaft to the driven shaft. The planet gear carrier is comprised of a flange 59 at the forward end of the driven shaft and a clutch ring 60 secured together by rivets 61. Extending between the carrier sections and supported thereby are shafts 62 on which planet gears 63 are rotatably mounted, the arrangement being such that the planet gears mesh with the internal teeth of gear 29. The planet gears also mesh with a sun gear 64 formed on the forward end of a sleeve shaft 65. This sleeve shaft is rotatably mounted on the driven shaft and extends rearwardly so that its end is telescoped by the bearing 57.

Between the casing section 24, bearing 57 and sleeve shaft 65 of the planetary gear connection is arranged an overrunning brake structure. On the sleeve shaft is splined a race 69 and between races 57 and 69 is arranged a plurality of rollers 66. The rollers are carried in slots in a cage 67 and the forward end of this cage terminates in a radial flange that engages a split flexible ring 68' seated in a groove in the race 69. Spaced ears 201 project inwardly from this radial flange and extend into arcuate grooves 202 in the bearing race 69, such grooves having a longer annular dimension than the ears to permit a limited rotational movement of the cage relative to the bearing race 69. A pair of split single convolution coil springs 203 are interposed within the cage and have one end anchored to the cage and the other end anchored to bearing 69, such springs both acting on the cage in a direction urging the rollers into wedging position against the cam surfaces 71 formed in bearing 57. These cam surfaces terminate at one end in arcuate recesses 70 so that the rollers will be free when lying adjacent thereto. The rollers will be wedged between the races where the planetary gearing is free except when the driven shaft overruns the tail shaft. Thus the planetary sleeve is held against rotation in first and second forward drive speeds so that the planetary gearing will form a reduction driving connection when the planetary is free.

As previously stated, the planet gear carrier section 60 forms a part of a control clutch and movable clutch mechanism is associated therewith for locking or unlocking the carrier with the sun gear shaft. Such clutch mechanism is of the tooth or dental type and preferably includes synchronizing means. The hub 72 is slidably splined on the sleeve shaft 65 and slidably splined to the hub and mounted to slide on the sleeve shaft is a clutch element 73, the splines of which are also arranged to mesh with teeth 74 on the clutch element 60. The clutch element 60 is also provided with a tapered rearwardly extending friction cone 75 with which a cone friction ring 76 fixed to the hub 72 is adapted to engage to bring the hub and the clutch section 60 to the same speed before the teeth of the clutch section 73 engage the teeth 74. A plurality of flat spring members 77 are secured across grooves in the periphery of the clutch hub section 72 and are formed with outwardly pressed detent portions 78 arranged to resiliently engage in recesses 79 formed in the inner periphery of the clutch section 73. These spring members 77 normally engage in the recesses 79 and hold the clutch sections 72 and 73 together so that when shifted forwardly the friction member 76 will engage the friction member 75 and bring the associated clutch sections to the same speed prior to the time the clutch section 73 is moved into engagement with the teeth 74. Continued pressure urging the clutch section 73 toward engagement with the teeth 74 will depress the spring elements so that the section 73 will then be freed to move forwardly into engagement with the teeth 74 as shown in Fig. 1. The clutch section 73 is actuated by mechanism including a yoke 80 fixed on shaft 81 extending through the casing section 24, and a control lever 82 fixed to this shaft at the outside of the casing section.

Engagement of clutch elements 73 and 74 locks the planetary carrier with the sun gear shaft to thereby provide direct drive from the tail shaft to the driven shaft, while disengagement of such elements allows the planetary gearing to operate and reduces the drive from the tail shaft to the driven shaft when the driven shaft does not overrun the tail shaft. The clutch control for the planetary gearing is preferably such that the planetary functions to provide a reduced drive only in first, second and reverse drives. The second and third speeds are preferably obtained with the same gear relation in the change speed gearing with the planetary clutch for selection controlled by a pressure system controlled by an electric system under control of the accelerator pedal and the gear shift rails.

The arrangement is also such that shifting of the clutch section 73 will occur through the medium of engine developed and spring power means so that the driver will not be called upon to do the actual shifting.

Anchored to the casing section 24 by bolt means 83 is a power cylinder 84 in which is arranged a piston 85 and secured to the piston is a rod 86 having lever 82 connected thereto by a pin 87. The piston and rod form a part of the clutch actuating mechanism previously referred to. Coil spring 88 is anchored at one end to pin 87 and at the other end to cover 55 in a relation normally exerting sufficient pull upon the clutch operating mechanism to disengage the clutch section 73 and hold it in the position shown in Fig. 2. Connected with the forward end of the cylinder is a power line 89 that leads to the intake manifold 90 of the engine 19. A portion of this power line includes aligned passages 91, 92 and 93 in the cover 18 of the casing section 23, and communication between such passages is controlled by the shift rails 43 and 50, the rail 50 being formed with a passage 94 and the rail 43 being formed with a passage 95.

When the rails are in position such that the passages 94 and 95 align with the passages 91, 92 and 93, which is in the high or fourth speed drive relation, then the forward end of the cylinder will be in open communication with the engine manifold and the suction on the piston 85 will overcome the spring 88 to move the piston to the forward end of the cylinder. This movement of the piston and its rod 86 will swing the lever 82 forwardly or clockwise, as viewed in Figs. 1, 2 and 3, so that the clutch element 73 will be moved into mesh with the teeth 74 of the clutch element 60, as shown in Fig. 1, thereby locking the planetary carrier element 60 with the sun gear sleeve 65. In such relation the planetary gearing will revolve as a unit and the drive from shaft 28 to shaft 52 will be direct. In all other driving relations of the change speed gearing, except high speed drive, vacuum will be cut off by the shift rails and the spring 88 will urge the power piston 85 to its rearmost position so that the clutch section 73 will be disengaged from the clutch section 60, as shown in Fig. 2, and thus when the clutch is disengaged the drive from shaft 28 to shaft 52 will be reduced through the planetary gearing. It will be understood, of course, that first and second speed drives can take place only when the overrunning brake is engaged as otherwise the sun gear would be free to rotate. In third and high the drive is direct from the tail shaft to the driven shaft, and in reverse the sun gear is held stationary by locking the clutch element 73. Thus the driven shaft can overrun the tail shaft only in first and second speed.

Third speed forward drive can be obtained only when the shift rail 50 is moved from high speed position to intermediate drive position. When the change speed gearing is in third speed relation, second speed drive can be obtained by releasing clutch section 73 from the clutch section 60 and, as before related, this is accomplished through actuation of the accelerator pedal so that the driver will not have to use his hands.

The accelerator pedal 100 is pivotally associated with the toe board in the usual manner and a rod 101 is attached to the underside thereof and extends through an opening in the toe board where it is connected to a bell crank 102, suitably pivoted to the vehicle. Between the throttle 103 and the bell crank is a two-part link 104, the parts of which can telescope so that they can be extended relatively while holding the throttle in wide open position. Coil spring 105 is associated with the link parts to normally return them from the extended relation caused by operation of the accelerator beyond a wide open throttle position. The normal or released position of the accelerator pedal is shown in dotted lines at 106 in Fig. 3 and the position of the accelerator at which the throttle is wide open is shown in dot-and-dash lines at 107 in Fig. 3. By pressing the accelerator downwardly below position 107 the throttle link will be extended and the lower arm of the bell crank 102 will be rocked rearwardly.

This bell crank cooperates with an electrical system for controlling the power mechanism for operating clutch 73. The motor vehicle battery is indicated at 108 and the wire 109 extends therefrom to the ignition switch 110. A wire 111 connects the ignition switch with one terminal of a switch 112 and with a terminal of switch 114. The other terminal of switch 114 is connected by a wire 115 with a solenoid 116 and a terminal of switch 112 is connected with wire 115. When the solenoid is energized it will draw a lock plunger 117 in an upward direction. Normally this lock plunger is moved downwardly by a coil spring 118. The solenoid is suitably mounted on the power cylinder and the lock plunger extends through the cylinder wall and is adapted to engage in a recess 119 in the piston rod 86.

Figure 6:
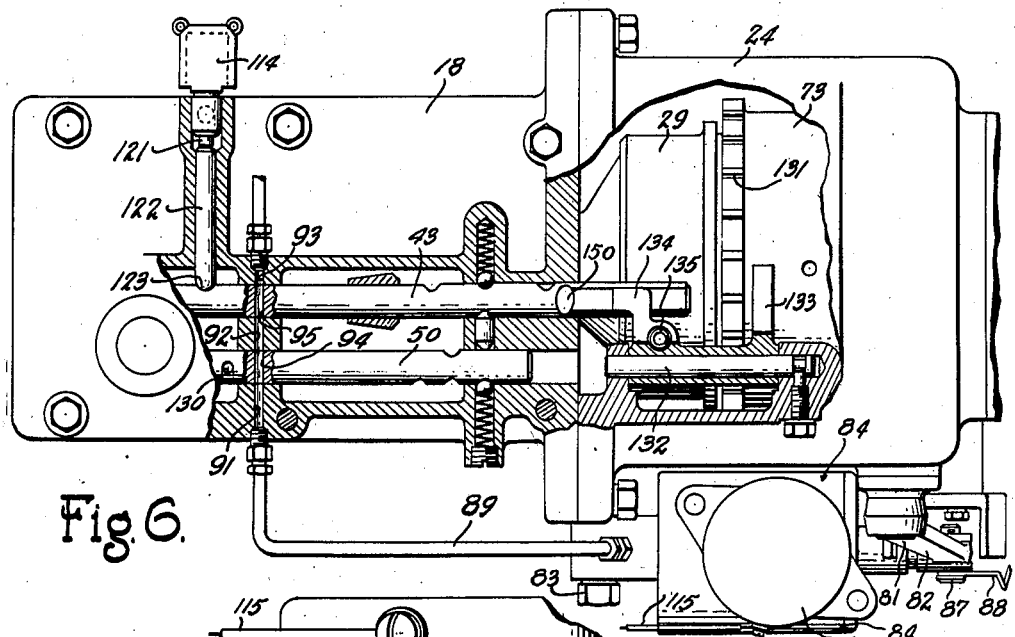
Fig. 6 is a plan view of the power transmitting mechanism with the casing broken away to show the change speed shift rails in control of the power means and the reverse gear lock.
Figure 7:
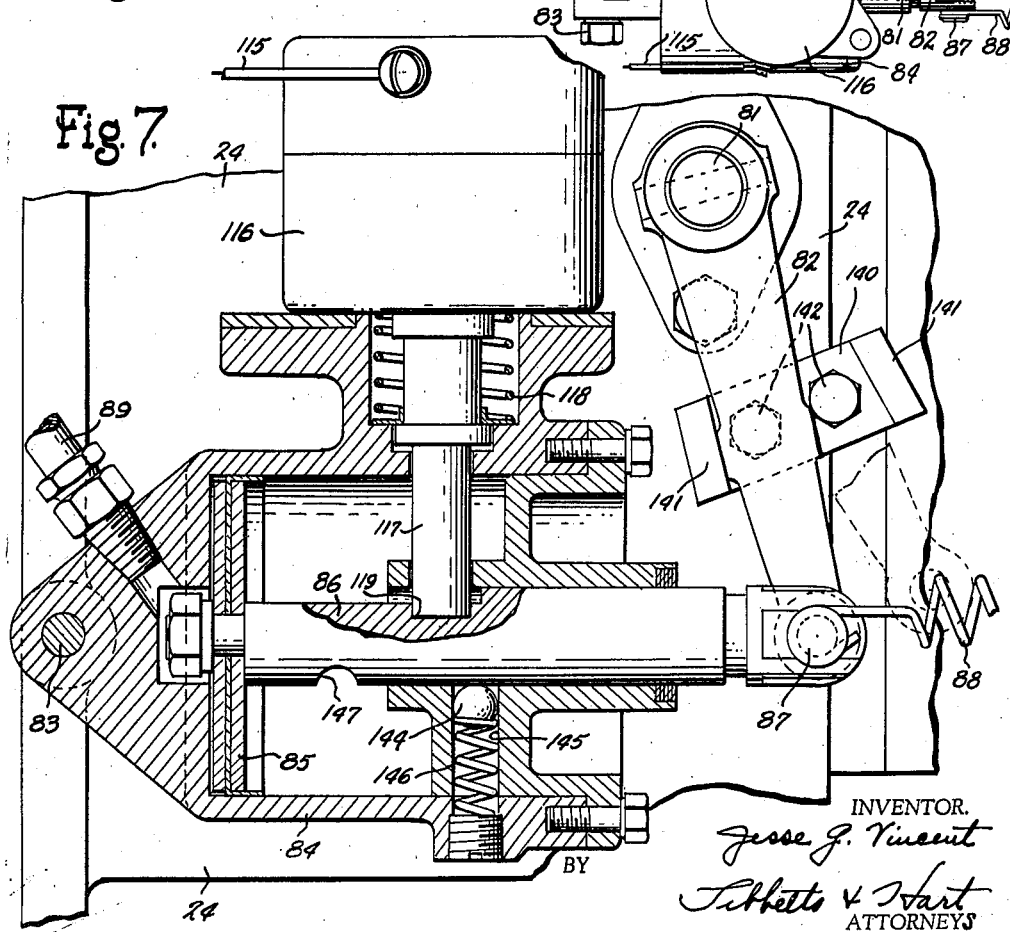
Fig. 7 is an enlarged view of the power device shown in Fig. 3 for shifting the mechanism to lock or unlock the planetary underdrive gearing.

The spring opened contact element 120 of switch 112 is arranged to be moved into circuit closing position by the bell crank 102 of the throttle mechanism when rocked in an anti-clockwise direction, as shown in Fig. 3, beyond a position fully opening the throttle. The switch 114 has a spring opened contact element 121 with which an actuator plunger 122 is associated. This plunger extends through the cover 18 and is engaged by shift rail 43 to close the switch 114 except when the rail is in neutral position. The rail has a recess 123 therein into which the plunger 122 is moved by the contact element spring when the rail is in neutral position, thus the switch 114 is closed to energize the solenoid 116 so that the lock member 117 is lifted when the change speed gearing is in first or reverse drive. At the same time the passage 95 through rail 43 is closed to passage 93 when rail 43 is in position to establish first or reverse drives so that the vacuum line to the power-cylinder is thereby cut off. When the rail 43 is in neutral position, as shown in Fig. 6, then the switch 114 is open and the passage 95 is open to passages 95 and 93, but of course the vacuum line is also controlled by the position of shift rail 50.

When switch 114 is closed by shift rail 43, the solenoid 116 will be energized and will withdraw and hold the lock member 117 out of recess 119 in the plunger rod 86. Under such condition spring 88 will move the plunger 85 to the rear of the cylinder 84 and thus actuate the associated mechanism to move the clutch element 73 out of mesh with the clutch teeth 74, as shown in Fig. 2. In such positions the shift rail 43 will shut off the vacuum line to the power mechanism. With the clutch element 73 disengaged, the planetary gearing is free to reduce the driving ratio between the tail shaft and the driven shaft.

With the shift rail 43 in neutral position, the switch 114 will be open allowing the spring 118 to urge the lock member 117 toward the plunger rod, and passages 92 and 93 will be open to each other. The shift rail 43 is of course in neutral position when the shift rail 50 is actuated to provide intermediate and high speed ratios in the change speed gearing and hence the switch 114 will be open under such circumstances.

When shifting up from first speed or reverse, the shift lever 44 is moved to engage rail 50. Rearward movement of the rail will establish intermediate drive through the change speed gearing and the relief passage 130 in the rail will register with passage 129 so that the power line 89 is open to atmosphere and spring 88 will retain the power mechanism in position disengaging clutch 73 from clutch element 74. Thus the planetary is free and reduces the drive from the tail shaft to the driven shaft so that a second speed forward drive results. When the shift rail is moved forwardly into position direct or high speed drive is established through the change speed gearing, as shown in Fig. 6, as the passage 94 will open the power line to cylinder 84 and the plunger 95 and its rod will be moved forwardly by suction thus operating the associated mechanism to move clutch element 73 into engagement with clutch element 74. With the clutch elements engaged, the planetary gearing is locked and direct drive is transmitted from the tail shaft to the driven shaft. When the power plunger is thus moved forward, upon shifting the change speed gearing into high speed ratio, the lock plunger 117 will be forced by spring 118 into recess 119 from which it cannot be released except by the solenoid.

While in high speed ratio, it is sometimes desirable to obtain a lower speed ratio to obtain acceleration, such for example as when passing another vehicle. Under such circumstance a speed between second and high can be readily obtained with this mechanism. Shift rail 50 is moved rearwardly to intermediate speed relation, thus cutting off the vacuum line to the power cylinder and venting the line to atmosphere through passages 130 and 129. But when shifting down from direct in this manner, the lockout plunger 117 is still engaged in recess 119 so that the clutch element 73 cannot be shifted out of engagement with the clutch element 74 by the spring 88 and, consequently, the drive from shaft 28 to shaft 52 will be direct thus providing a speed between second speed forward and high speed. When shifting down in this manner only the rail 50 is actuated and the switch 114 remains disengaged. In order to get back into second speed from third speed it is only necessary to press the accelerator pedal down a sufficient distance to move the actuator 120 rearwardly to close switch 112 whereupon the solenoid will be energized and the lock-out plunger 117 will be withdrawn from recess 119. The spring 88 can then function to move the power piston rearwardly and rock the shaft 81 and disengage the clutch element 73 from the clutch element 74 to thereby free the planetary gearing so that the drive from shaft 28 to shaft 58 is reduced. This positive drive through the planetary in third speed forward is useful when it is desired to use the engine for braking the vehicle's progress such as when going down hill or in passing another vehicle on the road.

Figures 4, 5:
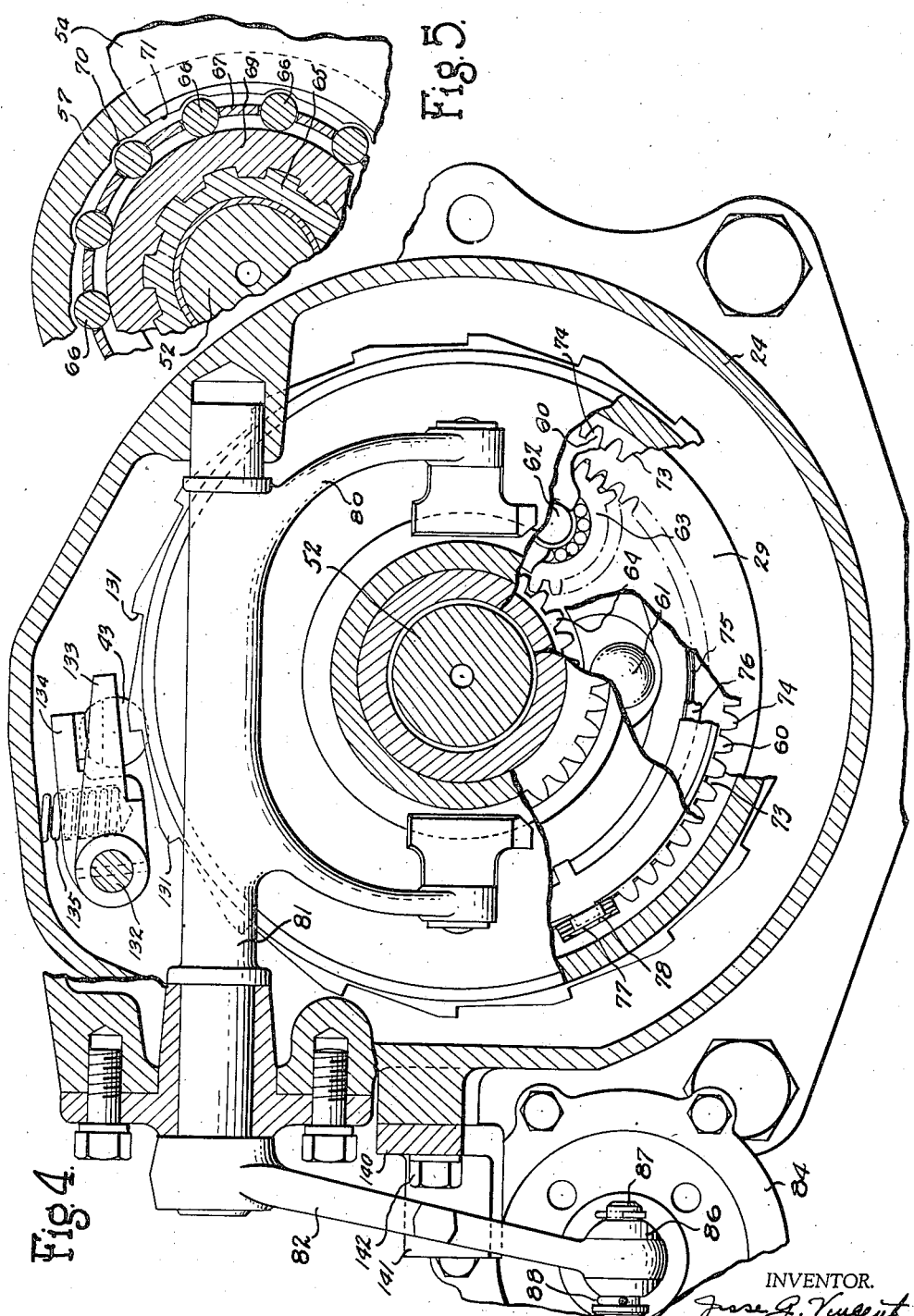
Fig. 4 is a sectional view taken on line 4—4 of Fig. 1.
Fig. 5 is a fragmentary sectional view of the overrunning brake, and associated mechanism taken on line 5—5 of Fig. 1.

With an overrunning brake in the drive mechanism it is necessary that some form of lock mechanism be provided when reverse drive is to be employed in order that the planetary gearing will be kept from idling. Such lock mechanism is preferably arranged to be actuated by the shift rail 43 when moved to establish a reverse drive through the change speed gearing. The outer periphery of the clutch element 73 is formed with teeth 131 at its forward end and fixed to a shaft 132, mounted in the upper part of the casing section 24, is a pawl 133. Fixed on this same shaft 132 is a control arm 134 arranged to ride on top of the rail 43, and engaging this arm and the adjacent casing section is a coil spring 135 for normally urging the arm in a downward direction. In the rail 43 is a recess 150 arranged so that when the rail is moved to a position shifting the change speed gear into reverse drive the arm 134 can drop into the recess and as the shaft 132 and the pawl 133 are fixed with the arm, the spring 135 will act to engage the pawl with teeth 131 on the clutch element so that the same is locked from rotation in an anti-clockwise direction as viewed in Fig. 4. The clutch being held against rotation will cause the planetary gearing to operate so that the reverse drive from the change speed mechanism to the crank shaft will be reduced.

Means for limiting the movement of the power piston is shown associated with the lever 82. Such means consists of a U-shaped plate 140 having ears 141 turned out from each end thereof, the plate being secured to the side of the casing section 24 by suitable bolts 142. The flanges 141 form stop members between which the lever 82 must rock and are so spaced that the power piston 85 will not move beyond desired limits in either direction of its axial travel.

The only time that the power piston can be moved by vacuum to engage the planetary clutch is when direct drive or high speed drive through the change speed mechanism is established because this is the only relation in which the rail ports open the power system to the power cylinder. In order to give vacuum an opportunity to build up sufficiently in the system to overcome the force of spring 88 and operate the clutch, delay means is provided. This means consists of a ball 144 slidable in a recess 145 in the power cylinder and urged toward the piston rod by coil spring 146. In the piston rod is a recess 147 into which the ball is pressed by the spring when aligned. The pressure of this spring 146 is sufficient to retain the ball in the rod recess until a predetermined vacuum has been built up in the end of the power cylinder sufficient to engage the planetary clutch.

The driver of the vehicle is thus able to shift from direct to third speed merely by moving the shift rod 50 rearwardly to intermediate speed position and he can shift back from third speed drive to direct drive by merely shifting the rail 50 forwardly to high speed position. It will be understood that the accelerator pedal should not be pressed beyond wide open throttle position when shifting in the manner just set forth.

When shifting down from third speed to second speed, the shift rail 50 must be in intermediate forward speed position and then upon closing the switch 112 by pressing the accelerator pedal beyond wide open throttle position, the solenoid will be energized and will withdraw the lock rod 117 from recess 119 allowing the spring 88 to release clutch element 73 from clutch element 72, thus freeing the planetary gearing. The change speed gearing is of course in the same relation for both second and third speeds but in second speed the planetary gearing is free to reduce the drive and in third speed it is locked to transmit direct drive.

The power transmitting mechanism herein described provides economical driving conditions for a motor vehicle and the control apparatus is readily operated with a minimum effort by the driver.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a power transmitting mechanism, a change speed gearing having movable means for controlling forward and reverse drive through a tail shaft, a driven shaft, planetary gearing drivingly connecting said shafts including an orbital gear sleeve telescoping the driven shaft, a casing around the planetary gearing, overrunning brake means associated with the casing and the sleeve, a clutch slidably splined on said sleeve and shiftable to lock or release the planetary gearing, lock means carried by the casing for engaging said clutch, and means operable by said change speed gearing control means for holding said lock means engaged with said clutch when said change speed gearing is driving in reverse.

2. In a power transmitting mechanism, change speed gearing having a tail shaft and shiftable means for establishing a plurality of forward speed drives and a reverse drive through said tail shaft, a driven shaft, planetary gearing drivingly connecting said shafts, a clutch shiftable to lock or release said planetary gearing and thereby establish direct or reduced drive between said shafts, a spring urging said clutch in one direction, mechanism for moving said clutch in the other direction, a fluid power system associated to actuate said clutch moving mechanism, and means under control of said shiftable means in said change speed gearing for controlling said power system.

3. In a power transmitting mechanism, change speed gearing having a tail shaft and ported shift rails, a driven shaft, planetary gearing drivingly connecting said shafts, a clutch shiftable to lock and release said planetary gearing and thereby establish direct or reduced drive between said shafts, a spring urging said clutch in one direction, mechanism operable to move the clutch in the opposite direction, and a fluid pressure line in operative relation with said clutch operating mechanism, the ported portions of said rails extending through said power line and controlling the application of pressure to said clutch operating mechanism.

4. In a power transmitting mechanism, a change speed gearing including shift mechanism and a tail shaft, a driven shaft, planetary gearing drivingly connecting said shafts, a clutch shiftable to lock and release parts of the planetary gearing to establish different driving speeds from the tail shaft to the driving shaft, mechanism operable to shift said clutch, a spring connected to urge said clutch shifting mechanism in one direction, a vacuum system for urging said clutch shifting mechanism in a direction opposite to that in which it is urged by said spring, and means in said change speed gearing shift mechanism controlling said vacuum system.

5. In a power transmitting mechanism, a change speed gearing including a pair of ported shift rails, a tail shaft and a casing in which the rails are slidably mounted, a driven shaft, planetary gearing drivingly connecting said shafts, a clutch shiftable to lock and release said planetary gearing, mechanism operable to shift said clutch, a spring normally urging said clutch shifting mechanism in one direction, and a fluid pressure system associated to overcome said spring and move said clutch mechanism in an opposite direction to that urged by the spring, said fluid pressure system being traversed and controlled by the ported portions of said change speed gearing shift rails, the rail ports being arranged to open the fluid system in only one of their positions of adjustment.

6. In a power transmitting mechanism, a change speed gearing tail shaft, a driven shaft, planetary gearing drivingly connecting said shafts, a clutch operable to lock said planetary, mechanism connected to engage said clutch including a piston and rod, a cylinder in which the piston is operable, a controlled pressure system connected with the cylinder for moving the piston to engage the clutch, a spring engaging said mechanism to disengage the clutch when the pressure system is ineffective, a spring pressed plunger normally engaging the piston rod to secure it in clutch engaging position, an electric system including a solenoid associated to release said plunger from the piston rod, and a physically operated switch in the electric system for engaging or deenergizing said solenoid, the energizing of said solenoid releasing the plunger to permit the clutch to be disengaged after said pressure system is shut off from the cylinder.

7. In a power transmitting mechanism, a planetary gearing clutch, mechanism operable to control said clutch, spring means acting on the mechanism to disengage the clutch, controlled power means connected to move said mechanism to engage the clutch, control means for the power means, means associated to engage and lock said mechanism when moved to position engaging said clutch, and automatic means under physical control for releasing said lock means from said mechanism when said power means is ineffective.

8. In a power transmitting mechanism, a planetary gearing clutch operable to provide a direct drive when engaged or a reduced drive when disengaged, mechanism including a link operable to shift said clutch, spring means acting on said mechanism to release said clutch, controlled power means acting on said mechanism to engage said clutch, lock means normally operating to positively hold said mechanism in clutch engaging position, electromagnetic means operable to disengage said lock means from said mechanism, and fixed stop means limiting the movement of said link by said spring means and said power means.

9. In a power transmitting mechanism, change speed gearing including a tail shaft, a casing for the gearing, shift rails movably mounted in bearings in the casing, a driven shaft, planetary gearing drivingly engaging said shafts, a clutch controlling said planetary to provide a direct or a reduced drive therethrough, mechanism normally effective to disengage said clutch, a fluid pressure system associated to move said mechanism to engage said clutch, said system extending through said rail bearings in the casing, said rails being ported to open the system to said mechanism only when positioned to establish direct drive through the change speed gearing, a lock normally operating to engage and secure the mechanism when moved to its clutch engaging position, and an electrical system under physical control for releasing said lock from said mechanism.

10. In a power transmitting mechanism, an engine having an intake manifold, an engine throttle valve control pedal, change speed gearing associated to be driven by the engine and having a tail shaft, bearings in the casing, shift rails for the gearing mounted in said bearings, a driven shaft, planetary gearing drivingly connecting said shafts, a clutch controlling said planetary gearing to effect a direct or reduced drive therethrough, mechanism operable to control said clutch, a spring connected to normally disengage said clutch, a power line connected to move the mechanism to clutch closing position, said line passing through the bearings in said encasing, said rails having ports to open said line only when said change speed gearing is in high speed relation, means effective to lock said mechanism in clutch engaging position, an electric system including a switch associated with said lock means to release it from said mechanism when energized, and means associated with said throttle valve control pedal for controlling said switch, said control means being effective to close the switch only when said pedal is moved beyond a position in which the throttle is wide open.

11. In a power transmitting mechanism, a throttle valve control pedal operated mechanism, change speed gearing including a pair of shift rails, a drive shaft, planetary gearing drivingly connecting the change speed gearing and the drive shaft, a clutch associated with the planetary gearing and operable to establish direct or reduced drive therethrough, clutch actuating mechanism, spring means acting on said mechanism to disengage said clutch, controlled pressure means connected to move said mechanism to engage the clutch, a member automatically locking said mechanism when in clutch engaging position, an electric system including a solenoid for releasing said member from locking relation with said mechanism, a pair of normally open switches operable to energize said system, said throttle control pedal mechanism being operative to close one of said switches when the pedal is beyond position in which the throttle valve is wide open, and means operable by one of said rails except when in neutral position for closing the other switch.

12. In a power transmitting mechanism, change speed gearing including a pair of shift control rails and a tail shaft, a drive shaft, planetary gearing drivingly connecting said shafts, a clutch associated with the planetary gearing and operable to establish direct or reduced drive therethrough, clutch actuating mechanism, means acting on said mechanism to normally disengage said clutch, controlled pressure means connected to move said mechanism in a direction to engage said clutch, a lock member automatically engageable with said mechanism when moved to clutch engaging position, an electric system including a solenoid for releasing said lock member from said mechanism, a normally open switch in said system, and control means engageable with one of said shafts to close said switch when the same is in any position except neutral.

13. In a power transmitting mechanism, change speed gearing having shiftable control means, an engine throttle valve control mechanism including a pedal, a drive shaft, planetary gearing drivingly connecting the shaft with the change speed gearing, a clutch associated with the planetary gearing and operable to establish direct or reduced drive therethrough, clutch actuating mechanism, means acting on said mechanism to normally disengage said clutch, controlled pressure means connected to move said mechanism in a direction to engage said clutch, a lock member automatically engageable with said mechanism when moved to clutch engaging position, and an electric system including a solenoid and a normally open switch, said switch being arranged to be engaged and held closed by said throttle valve mechanism when said pedal is moved beyond a position in which the throttle valve is wide open.

14. In a power transmitting mechanism for providing four forward speed drives and a reverse drive, change speed gearing including a tail shaft and control mechanism operable to obtain three forward speeds and a reverse driving speed, a driven shaft, planetary gearing drivingly connecting said shafts, a control clutch operable to establish direct or reduced drive through the planetary gearing, mechanism operative to engage and release said clutch, power means operable to move said mechanism to clutch engaging position when said change speed gearing is in high speed driving relation, and means operable to selectively retain said mechanism in clutch engaging position or to release the same after said change speed gearing is changed from high speed relation to intermediate drive relation.

15. In a power transmitting mechanism for providing three forward speed drives, change speed gearing including a tail shaft and control mechanism operable to establish two forward speed drives through the tail shaft, a driven shaft, planetary gearing drivingly connecting said shafts, a clutch operable to lock and release said planetary gearing, mechanism for operating said clutch, means automatically operable to move said mechanism to engage said clutch, means operated by said change speed control mechanism for controlling said power means, said power means control allowing effective operation of said power means to engage the clutch in one speed establishing relation of the change speed gearing and to discontinuing effective operation of the power means to release the clutch in the other speed establishing relation of the change speed gearing, and means for selectively locking or releasing said mechanism to engage or disengage the clutch when the change speed gearing is in the last mentioned relation.

JESSE G. VINCENT.